(12) United States Patent
Cheer et al.

(10) Patent No.: US 10,424,437 B2
(45) Date of Patent: Sep. 24, 2019

(54) FAULT CURRENT LIMITER

(71) Applicant: Faultcurrent Limited, Cardiff, South Glamorgan (GB)

(72) Inventors: Andrew Cheer, Worcestershire (GB); Jeremy Hall, South Glamorgan (GB)

(73) Assignee: Faultcurrent Limited, Cardiff (GB)

( * ) Notice: Subject to any disclaimer, the term of this patent is extended or adjusted under 35 U.S.C. 154(b) by 270 days.

(21) Appl. No.: 15/311,251

(22) PCT Filed: May 19, 2015

(86) PCT No.: PCT/GB2015/051463
§ 371 (c)(1),
(2) Date: Nov. 15, 2016

(87) PCT Pub. No.: WO2015/177530
PCT Pub. Date: Nov. 26, 2015

(65) Prior Publication Data
US 2017/0092418 A1    Mar. 30, 2017

(30) Foreign Application Priority Data
May 19, 2014  (GB) .................................. 1408855.3

(51) Int. Cl.
| H01F 38/02 | (2006.01) |
|---|---|
| H01F 27/36 | (2006.01) |
| H01F 27/24 | (2006.01) |
| H02H 9/02 | (2006.01) |
| H01F 3/12 | (2006.01) |
| H01F 3/10 | (2006.01) |

(52) U.S. Cl.
CPC ............ *H01F 38/023* (2013.01); *H01F 3/12* (2013.01); *H01F 27/24* (2013.01); *H01F 27/365* (2013.01); *H02H 9/02* (2013.01); *H02H 9/021* (2013.01); *H01F 2003/103* (2013.01)

(58) Field of Classification Search
CPC .. H02H 9/02; H02H 9/021; H01F 3/12; H01F 27/24; H01F 27/365; H01F 38/023; H01F 2003/103
USPC ....................................................... 361/93.9
See application file for complete search history.

(56) References Cited

FOREIGN PATENT DOCUMENTS

| GB | 2415833 A | 1/2006 |
|---|---|---|
| GB | 2491641 A | 12/2012 |
| GB | 2491642 A | 12/2012 |
| JP | 2003-009386 A | 1/2003 |
| WO | WO2013/142919 A1 | 10/2013 |
| WO | WO-2014128697 A1 * | 8/2014 ............ H01F 27/38 |

* cited by examiner

*Primary Examiner* — Kevin J Comber
(74) *Attorney, Agent, or Firm* — Gordon & Jacobson, P.C.

(57) ABSTRACT

A Fault Current Limiter (FCL) comprising a magnetisable limb, an electrically conductive coil associated with the magnetisable limb and arranged to induce a field in the limb member and magnets spaced such that the coil is positioned intermediate the spaced magnets. Magnetisable shield elements are positioned at either end of the coil.

18 Claims, 14 Drawing Sheets

FAULT CURRENT LIMITER

CROSS-REFERENCE TO RELATED APPLICATIONS

This application is the National Stage of International Patent Application No. PCT/GB2015/051463 filed on May 19, 2015, which claims priority from British Patent Application No. GB 1408855.3 filed on May 19, 2014, both of which are hereby incorporated by reference herein in their entireties.

BACKGROUND

1. Field

This invention relates generally to a Fault Current Limiter (FCL).

More particularly the invention relates to a FCL having a one or more magnetisable core limbs bridging the gaps between orthogonally oriented permanent magnets, the core limbs are provided with one or more electrically conductive coils.

2. State of the Art

WO2013/030571 discloses, FCL configurations having one or more magnetisable core limbs bridging the gaps between orthogonally oriented permanent magnets, the limbs being provided with electrically conductive coils. In the embodiment shown in for example in FIGS. 13 and 14, copper shims or plates placed at the sides or above the poles of the permanent magnets in the FCL to allow some protection of the magnets from AC fields generated by the coils.

It has been found that although a degree of shielding can be achieved in this way it is unlikely to be sufficient to divert coil fluxes due to the initial, sub-transient offset fault current which may demagnetise at least a portion of the permanent magnet.

Furthermore other inventive and desirable technical characteristics have been devised in relation to FCLs.

SUMMARY

An improved arrangement has now been devised.

According to the present invention, there is provided a Fault current limiter comprising:

at least one magnetisable limb member;
at least one electrically conductive coil associated with the magnetisable limb member and arranged to induce a magnetic field in the limb member;
magnets spaced such that the coil is positioned intermediate the spaced magnets;
wherein magnetisable shield elements are positioned at either end of the coil.

Typically the electrically conductive coil is mounted on the limb member or on a magnetisable core member co-axial with the limb member. Limb member (or limb member lengths preferably extend away from opposed ends of the coil.

The limb member preferably extends adjacent that least one of the magnets so as to form part of a magnetic circuit with the respective magnet.

The shield elements placed at either end of the coil, divert sufficient flux generated by the coil to a path away from the adjacent closest surfaces of the magnets. At the same time the shield elements should not excessively divert static flux from the magnets to cause de-saturation of soft magnetic limbs which are encompassed by the coil. (It can be important that these regions remain saturated during normal, non-fault operation of the FCL so as to ensure low inductance and hence low voltage drop during this time.)

Typically the FCL core (of either a ring or a linear structure) includes a multitude of pairs of coil/limbs bridging the gaps between orthogonally orientated permanent magnets, especially ceramic ferrite magnets. Ring structure FCL cores are disclosed in for example FIGS. 3, 4 and 6 of WO2013/030571.

In an embodiment of the present invention, ferromagnetic shields are placed at either end of the coils preferably in a stacked FCL arrangement.

The shield elements may encompass some or all of the following features:

- A height dimension (h) sufficient to divert a sufficient proportion of the coil fluxes due to the initial, sub-transient offset fault current which may demagnetise at least a portion of the permanent magnet which may be at least equal to the build-up (i.e. the radial dimension) of the coil.
- A width dimension (w) that extends beyond the width of the magnetisable core limb and permanent magnet sufficient to divert a sufficient proportion of the coil fluxes due to the initial, sub-transient offset fault current which may demagnetise at least a portion of the permanent magnet which may be at least equal to the build-up of the coil.
- A thickness dimension (t) sufficient to divert a sufficient proportion of the coil fluxes due to the initial, sub-transient offset fault current which may demagnetise at least a portion of the permanent magnet.
- A space between at the interface between the shield element and the core limb which is zero or some finite minimal value so as to minimise diversion of static fluxes.

The shield elements will beneficially possess a saturation magnetisation sufficient to divert a sufficient proportion of the coil fluxes due to the initial, sub-transient offset fault current which may demagnetise at least a portion of the permanent magnet.

The shield elements will beneficially be of a ferromagnetic material, preferably mild steel, grain or non-oriented electrical steel, another grade of crystalline or amorphous soft ferromagnetic alloy. In a case which requires high saturation due to high flux or limited space for shields Co-Fe alloy may be specified.

The shield elements may be may be solid or in certain situations preferably laminated (for example to reduce eddy current heating). The orientation of lamination may be parallel to the sense of the coil but perpendicular to the limb (which may be encompassed by the coil). Laminations may also enhance the shielding effectiveness and alternatively, the orientation of lamination may be perpendicular to the sense of the coil (i.e. the plane of the lamination facing the axial direction of the coil). Laminations may also focus the field along the direction of the steel limb beyond the axial length of the coil and alternatively, the orientation may be parallel to the sense of the coil and parallel to the steel limb.

An array, set or rank of shield elements may be provided in place of a single shield element. Such an array, set or rank of shield elements may comprise a plurality of shield elements separated by small gaps. The plane of the gap(s) typically faces the axial direction of the coil. Such an array, set or rank of shield elements separated by small gaps has been found to enhance the shielding factor.

In certain embodiments the material of each shield may or may not be the same, e.g. the first shield closest to the coil may possess highest saturation magnetisation whereas the next or furthermost shield may possess excellent permeability. Additionally, a combination of magnetically permeable and electrically conductive shield may be specified to optimise the shielding effect.

In different embodiments the shield element laminations may be stacked on a long bolt(s) or held in a framework and may be removable or resettable in terms of position and proximity to adjacent limb, coil and magnets.

The side profile of the shield may be square or rectangular or may take another form such a rhomboid, tetrahedral, triangular, curved, complex (e.g. having straight and curved regions or an irregular polygon with a chamfered corner farthest from the coil).

Typically, the shield at each side of the coil would extend along only part of the distance around the outer distance around the coil or alternatively may extend the entire distance in which case the cross section may or may not be the same along the length of the single fully extended shield. The purpose of the shape would be to (i) optimise the deviation of coil fluxes away from the permanent magnets and (ii) to minimise diversion of static fluxes from the magnets.

In different embodiments the magnetic shield elements may be fixed permanently with respect to the coils and core limb members and magnets or may be adjustable (in terms of position) or removable. In the case where shields are removable they may be replaceable by shields differing in size, shape, material, position or some other aforementioned feature(s).

The shield elements may possess an additional advantage (over the primary purpose of providing shielding) of allowing some additional inductance in the electrical circuit. The advantage of the feature would be to allow some degree of flexibility of provision of inductance for a given coil or distributed coils of an FCL with a given number of turns. Care would be taken to not cause excessive additional inductance due to diversion of static fluxes under normal, non-fault operation.

The magnetic performance of the shield elements are arranged to interact with the flux carrying capacity of the magnetic iron limb supporting the current carrying coil located between the shield elements. The cross sectional area of the iron limb can be used to adjust the transition from low to high inductance for a given peak value of AC flux. The shape of the resulting differential inductance curve as a function of instantaneous current can be manipulated through dimensional changes to achieve the desired characteristics by adjusting Cross sectional area of the magnetic iron limb between the shields
Shield height
Shield width
Shield spacing
Shield spacing from the magnetic face The magnetic action of the shields tend to focus the flux lines such that they run parallel to the saturated magnetisable limb members in the region of the coil windings. The parallel flux lines have less tendency to intersect with low profile types of winding as commonly used in high current density transformers and inductors. A beneficial reduction in the eddy currents flowing within the conductors can thus be observed resulting in lower power losses and reduced heating effects.

Simulations of eddy current losses for foil based FCL inductors, with and without shields, indicate the shields can mitigate up to 75% of the eddy current power losses In one preferred embodiment the FCL comprises a structure having a plurality of repeating levels or ranks (such as a stack) arranged one adjacent or above the other, each level or rank including a magnetisable limb member; an electrically conductive coil associated with the magnetisable limb member; and magnets spaced such that the core limb member extends intermediate the spaced magnets. The structure may be in the form of a ring structure such as for example a polygonal shaped ring or circular shaped ring.

In a preferred embodiment of structure employing a plurality of levels such as a stacked FCL core, a multiple of pairs of coil/limbs bridging the gaps between permanent magnets. Previously it has been considered advantageous from the point of view of ease of assembly to include magnetisable limb/coil assemblies placed outermost on the exposed poles of the magnets (as well as within the core between facing pairs of magnets). Since a method for insertion of limb/coils has been developed which negates this advantage the stacked FCL core may be conceived with all limb/coil assemblies contained within the assembly of permanent magnets. The concept has evolved so that the uppermost and lowermost limb/coils also have permanent magnets with poles facing directly towards the magnet stack below. These magnet pairs are also bridged with a soft magnetic limb which aids the saturation of the limb carrying the coil by reducing stray flux leakage from the pole face of the magnets.

The outer limbs do not carry coil windings and are intended only to carry flux between permanent magnets to reduce open circuit demagnetisation effects and also stray flux. The height of the pole cap magnets may be half that of the magnets between the limbs which carry the coils. The outer limbs carry only static fluxes of the permanent magnets are may be fabricated from low cost solid soft magnetic material such as mild steel or iron of sufficient thickness to minimise reluctance of the magnetic path.

According to another aspect of the invention, there is therefore provided a FCL comprising a structure (such as a stack) having a plurality of repeating levels, rows or ranks arranged one adjacent or above the other, each level row or rank including a magnetisable limb member; an electrically conductive coil associated with the magnetisable limb member; and magnets spaced such that the limb member and coil are positioned intermediate the spaced magnets; wherein an outer portion of the structure (typically the upper and/or lower side of the structure) comprises an outer magnetisable limb member extending between spaced magnets which outer magnetisable limb does not have an associated coil.

The structure may be in the form of a ring structure such as for example a polygonal shaped ring or circular shaped ring.

Observations as a result of magnetic simulation indicate that this configuration provides a greater utilisation of flux from the permanent magnets. Comparison between the exposed pole and magnetic bridged pole configurations, employing identical permanent block magnet designs, reveal that the magnetically bridged pole design of Fault Current limiter is more efficient requiring between 10%-20% less winding turns to achieve a similar peak inductance.

Inclusion of coil tappings is a well-known technique for adjusting the turns-ratio of transformers. In the case of an inductor, the inductance can be varied by altering the air gap in a gapped core (usually a semi-permanent solution, which requires a manual intervention) or through changing the number of turns in the coil. Usually the number of turns is fixed during the design of the inductor.

In order to adjust the characteristics of a inductive FCL which does not contain an air gap or a readily adjustable air gap, or in an open magnetic circuit type of FCL where a change in the non-magnetic path length does not have a significant effect, it is proposed that winding tappings could be included to allow the number of turns to be altered. In the case where the total number of turns are distributed in several pairs of coils on an FCL core, tappings may be included on just one coil pair, or a multiple number of pairs of coil winding pairs.

Other aspects of the invention are defined in the appended claims. Features of different claims and aspects can of course be combined with one another in relation to preferred realisations of inventive FCL arrangements.

These and other aspects of the present invention will be apparent from and elucidated with reference to, the embodiment described herein.

An embodiment of the present invention will now be described by way of example and with reference to the accompanying drawings.

DETAILED DESCRIPTION

Figure 1:
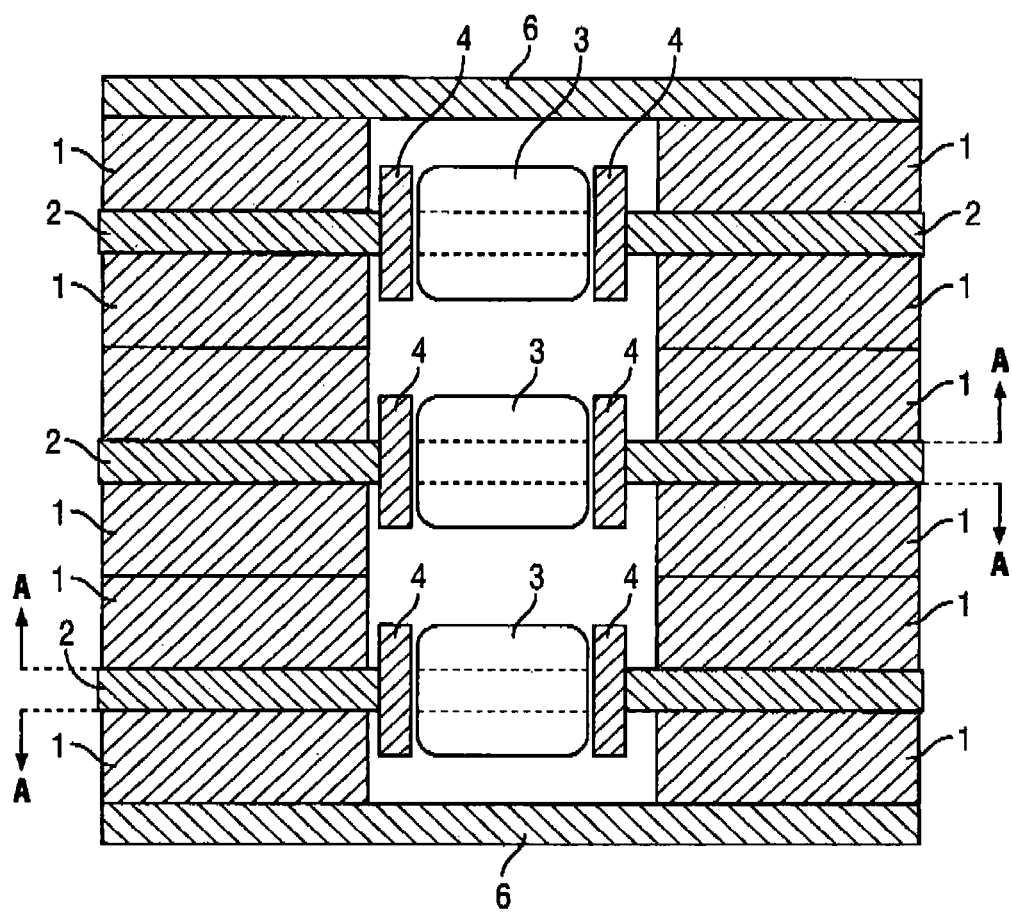
FIG. 1 illustrates a schematic section of a FCL in accordance with the invention.

Referring to the drawings, and initially to FIG. 1, the key elements of a FCL structure in accordance with the invention are spaced permanent magnets 1, limb members 2, AC conductive coils 3 for carrying the Fault Current positioned intermediate the spaced permanent magnets 1. The AC coils induce an alternating field in the limb members in the event of a Fault current. The stacked FCL core as depicted in FIG. 1 (of either a ring or a linear structure) includes 3 layers or ranks of coil 3 and limbs 2 bridging the gaps between orthogonally orientated permanent magnets 1 (typically ceramic ferrite magnets). The principle of operation of the FCL is generally accordance with the principles taught in WO2013/030571 and do not need to be explained in detail again here.

In accordance with one aspect of the invention, ferromagnetic shields 4 are placed at either end of the coils 3, either side of an iron core limb encompassed by the coil 3. The shields 4 act to divert sufficient flux generated by the coils 3 to a path away from the adjacent closest surfaces of the permanent magnets 1. At the same time the shields are tailored in terms of geometry position and size so as to, not excessively, divert static flux from the permanent magnets 1 to cause de-saturation of the soft magnetic limbs encompassed by the coils. (It is important that these regions remain saturated during normal, non-fault operation of the FCL so as to ensure low inductance and hence low voltage drop during this time.)

The magnetic action of the shields 4 tend to focus the flux lines such that they run parallel to the saturated iron limbs in the region of the inductor coil 3 windings. The parallel flux lines have less tendency to intersect with low profile types of winding as commonly used in high current density transformers and inductors. A beneficial reduction in the eddy currents flowing within the conductors can thus be observed resulting in lower power losses and reduced heating effects.

Simulations of eddy current losses for foil based FCL inductors, with and without shields, indicate the shields can mitigate up to 75% of the eddy current power losses.

According to a further aspect of the invention, and as shown for exemplary purposes in FIG. 1 the uppermost and lowermost limb/coils also have permanent magnets with poles facing directly towards the magnet stack below. These magnet pairs are also bridged with a soft magnetic limb 6 which aids the saturation of the limb carrying the coil by reducing stray flux leakage from the pole face of the magnets. The outer limbs 6 do not carry coil windings and are intended only to carry flux between permanent magnets 1 to reduce open circuit demagnetisation effects and also stray flux. The height of the pole cap magnets 1 may be half that of the magnets between the limbs 2 which carry the coils 3. The outer limbs 6, are free of AC coil windings and carry only static fluxes of the permanent magnets are may be fabricated from low cost solid soft magnetic material such as mild steel or iron of sufficient thickness to minimise reluctance of the magnetic path.

Observations as a result of magnetic simulation indicate that this configuration provides a greater utilisation of flux from the permanent magnets. Comparison between the exposed pole and magnetic bridged pole configurations, employing identical permanent block magnet designs, reveal that the magnetically bridged pole design of Fault Current limiter is more efficient requiring between 10%-20% less winding turns to achieve a similar peak inductance.

Figure 2:
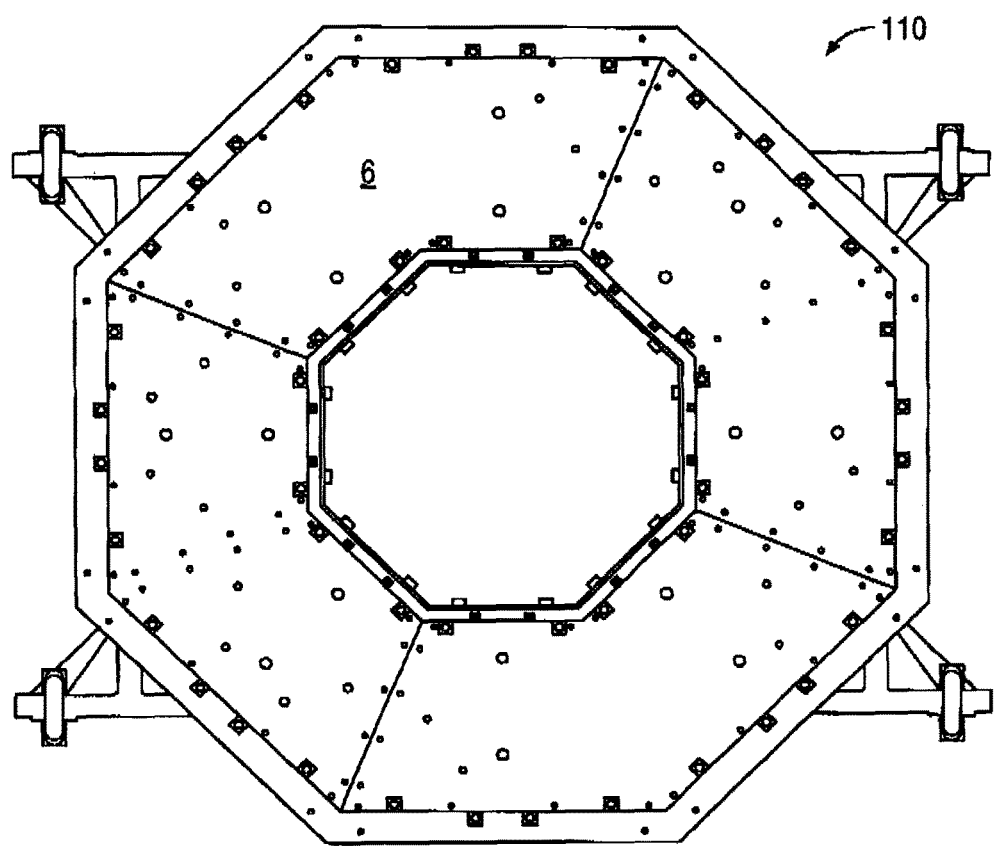
FIG. 2 is a plan view of an exemplary FCL structure in accordance with the invention.
Figure 3:
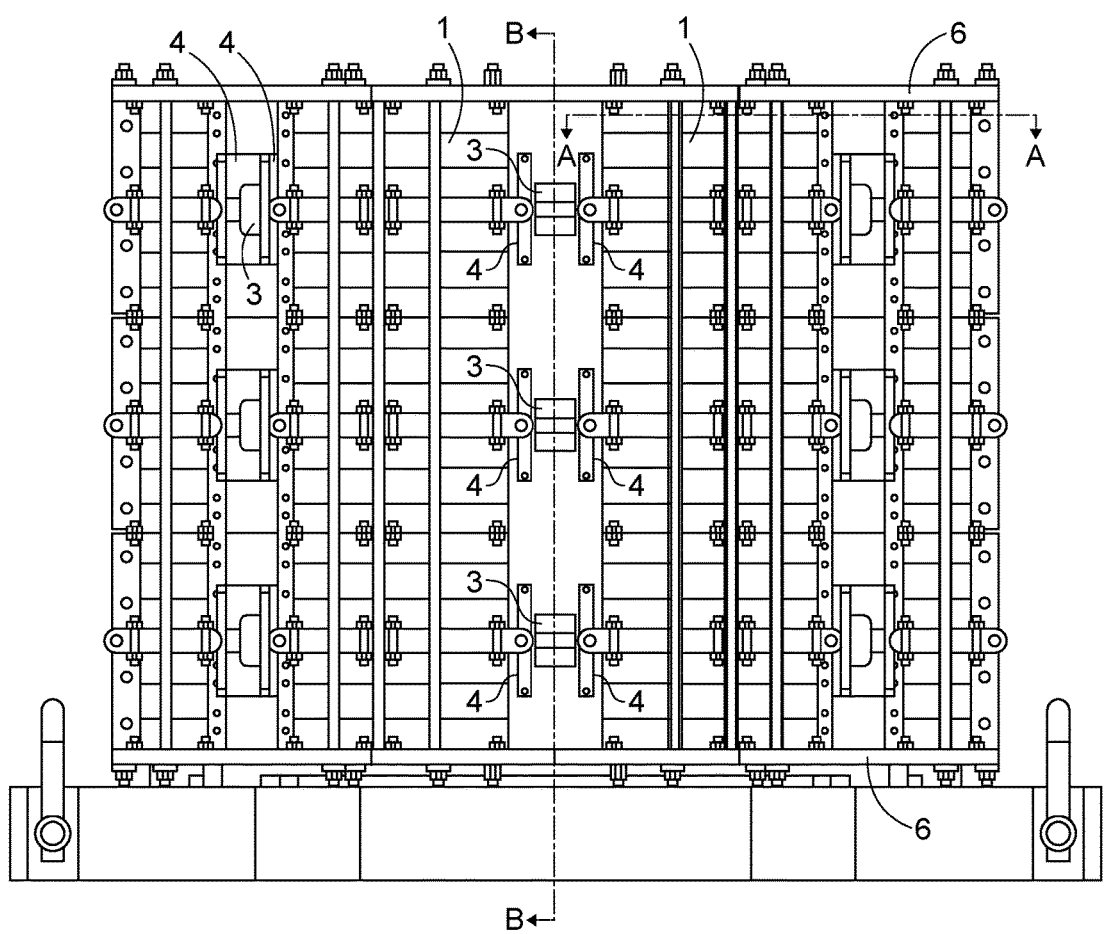
FIG. 3 is a side view of the FCL structure of FIG. 1.
Figure 4:
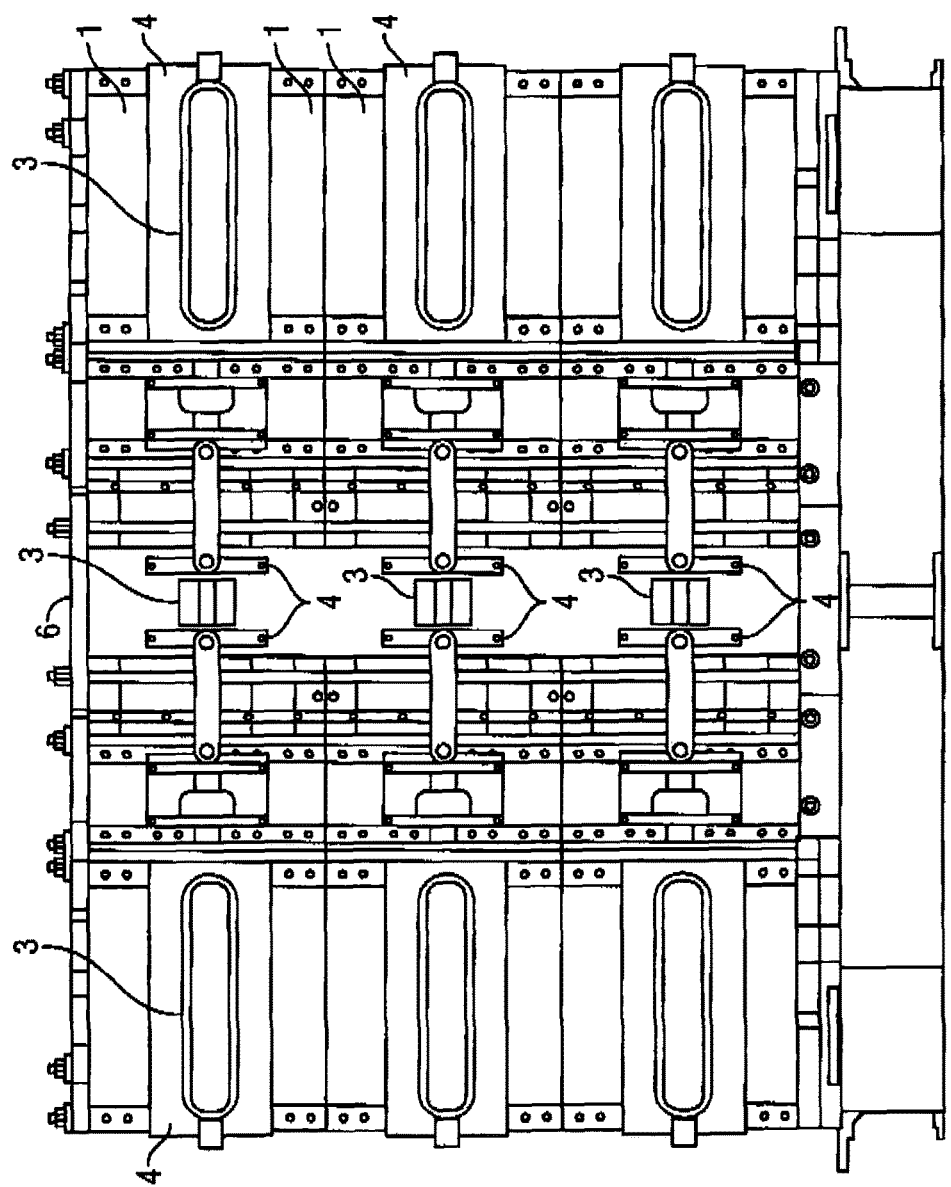
FIG. 4 is a section along B-B in FIG. 3.
Figure 5:
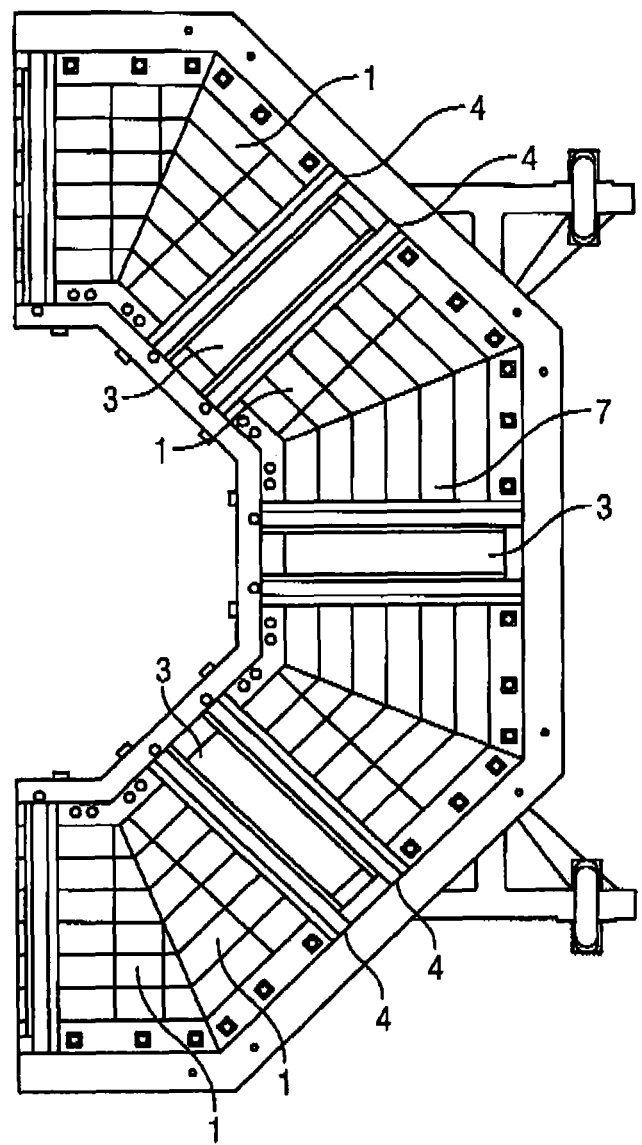
FIG. 5 is a section along A-A in FIG. 3.

FIGS. 2 to 4 disclose an exemplary octagonal ring shaped FCL stack structure 110 embodying the stacked three layer coil and limb scheme described in relation to FIG. 1. In this embodiment as shown in the figures can be seen the permanent magnets 1, the AC coils 3, the magnetisable limbs 2, the shields 4 and the outer limbs 6. From the drawings it can be seen that the shields 4 have a height dimension (h) greater than the height of the coils; a width dimension (w) greater than the width of the coils 3; and a thickness dimension (t) less than the thickness of the coils 3. These dimensions and the geometric shape of the shields 4 can be tailored for best effect for particular applications by computer modelling and trial and error.

The shields 4 in operation possess a saturation magnetisation sufficient to divert a sufficient proportion of the coil 3 fluxes due to the initial, sub-transient offset fault current which may demagnetise at least a portion of the permanent magnets 1. This material may be mild steel, grain or non-oriented electrical steel, another grade of crystalline or amorphous soft ferromagnetic alloy. In a case which requires high saturation due to high flux or limited space for shields Co-Fe alloy may be specified.

The shields 4 may be solid or in certain embodiments laminated to reduce eddy current heating. The orientation of lamination may be perpendicular to the sense of the coil (i.e. the plane of the lamination facing the axial direction of the coil) or, alternatively, parallel to the sense of the coil but perpendicular to the steel limb encompassed by the coil.

Lamination of the shields 4 will also enhance the shielding effectiveness. The orientation of lamination may be perpendicular to the sense of the coil (i.e. the plane of the lamination facing the axial direction of the coil).

Figure 15:
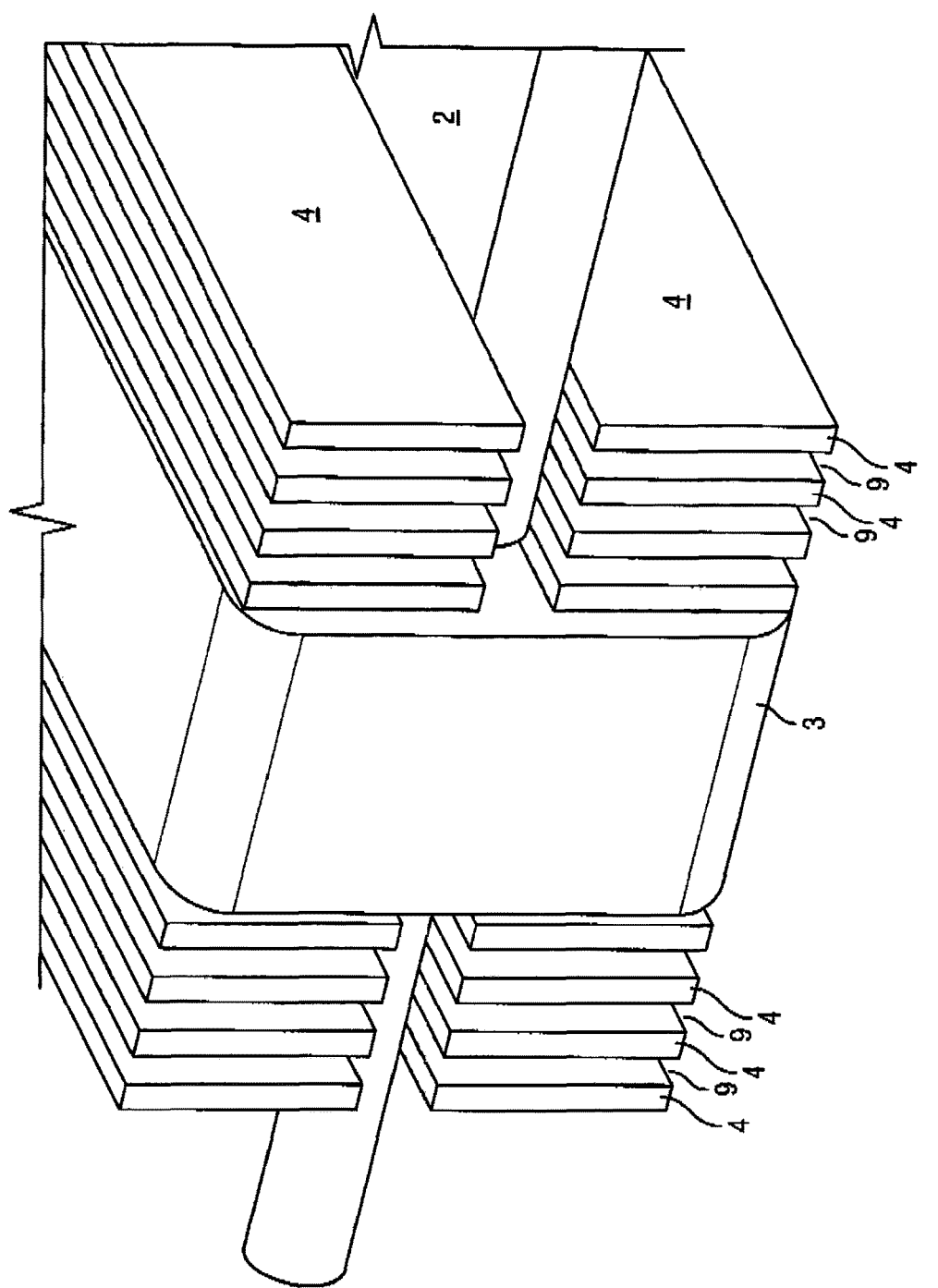
FIG. 15 shows an alternative arrangement of shield elements.

A set of shields 4 separated by small gaps 9 may be specified (with the plane of the gap(s) facing the axial direction of the coil) to enhance the shielding factor. Such an arrangement is shown in FIG. 15. The material of each shield may or may not be the same, e.g. the first shield closest to the coil may possess highest saturation magnetisation whereas the next or furthermost shield may possess excellent permeability. Additionally, a combination of magnetically permeable and electrically conductive shield may be specified to optimise the shielding effect.

The shield laminations may be stacked on a long bolt(s) or held in a framework and may be removable or resettable in terms of position and proximity to adjacent limb, coil and magnets.

The side profile of the shield may be square or rectangular or may take another form such a rhomboid, tetrahedral, triangular, curved, complex (e.g. having straight and curved regions or an irregular polygon with a chamfered corner farthest from the coil). The shield at each side of the coil would extend along only part of the distance around the outer distance around the coil or alternatively may extend the entire distance in which case the cross section may or may not be the same along the length of the single fully extended shield. The purpose of the shape would be to (i) optimise the deviation of coil fluxes away from the permanent magnets and (ii) to minimise diversion of static fluxes from the magnets.

The magnetic shields 4 may be fixed permanently with respect to the coils and limbs and magnets or may be adjustable (in terms of position) or removable. In the case where shields are removable they may be replaceable by shields differing in size, shape, material, position or some other aforementioned feature(s).

The magnetic shields 4 may be specified to possess an additional advantage (over the primary purpose of providing shielding) of allowing some additional inductance in the electrical circuit. The advantage of the feature would be to allow some degree of flexibility of provision of inductance for a given coil or distributed coils of an FCL with a given number of turns. Care would be taken to not cause excessive additional inductance due to diversion of static fluxes under normal, non-fault operation.

Figure 17:
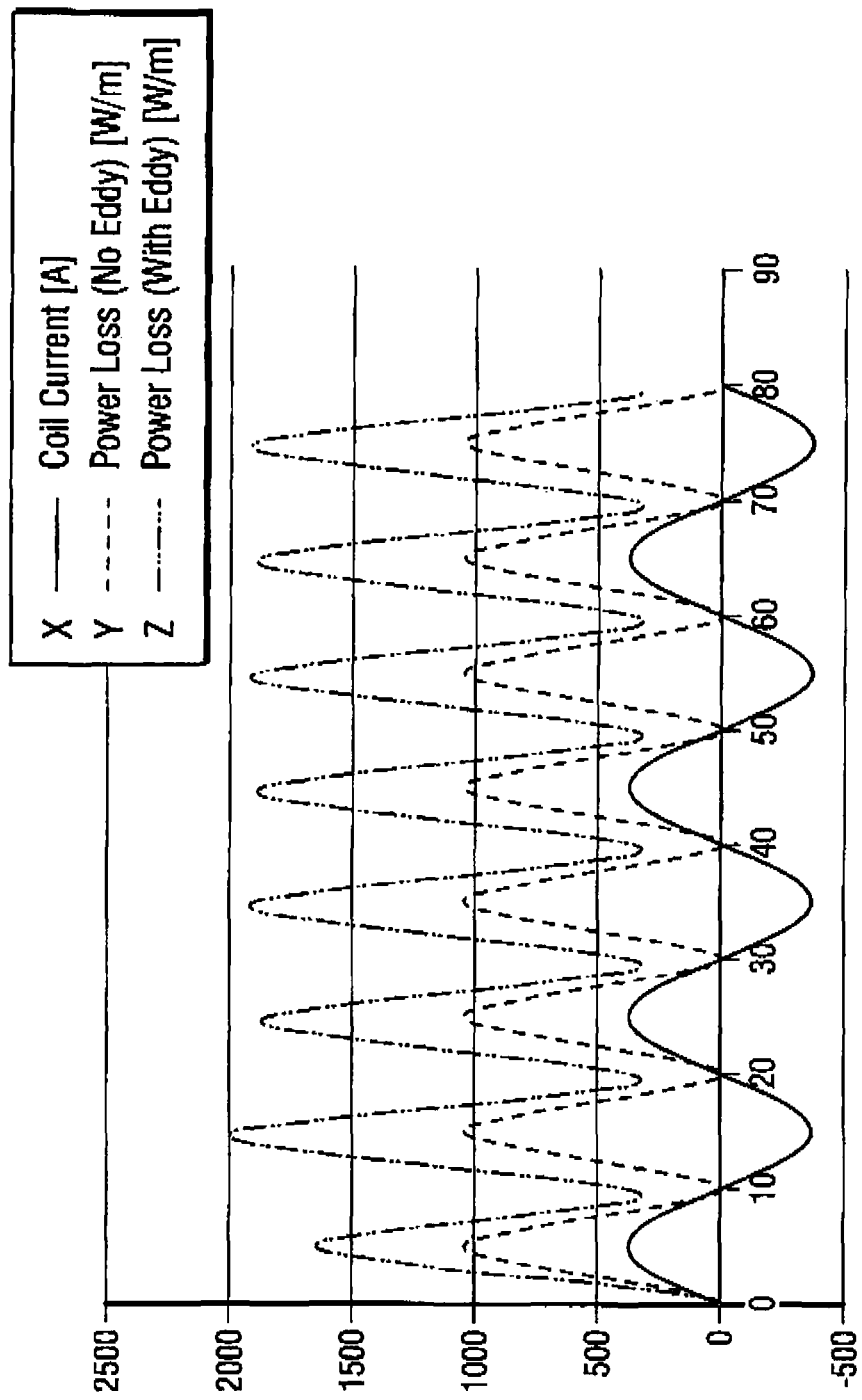
FIG. 17 is a graphical representation comparing FCL power loss with and without shields present.

The magnetic performance of the shields 4 are arranged to interact with the flux carrying capacity of the magnetic iron limb supporting the current carrying inductor located between the shields. The cross sectional area of the iron limb can be used to adjust the transition from low to high inductance for a given peak value of AC flux. The shape of the resulting differential inductance curve as a function of instantaneous current can be manipulated through dimensional changes to achieve the desired characteristics by adjusting Cross sectional area of the magnetic iron limb between the shields
Shield height
Shield width
Shield spacing
Shield spacing from the magnetic face FIG. 17 shows results from a computer aided simulation showing the reduction of eddy current power losses in a foil wound coil. Power losses in the coils with shields present (denoted as "no eddy") and without magnetic shields present (denoted "with eddy") are shown. The current in the foil winding is also shown.

Other preferred features in respect of the shields 4 and other technical elements are described in relation to the general definition of the invention earlier.

Figure 16:
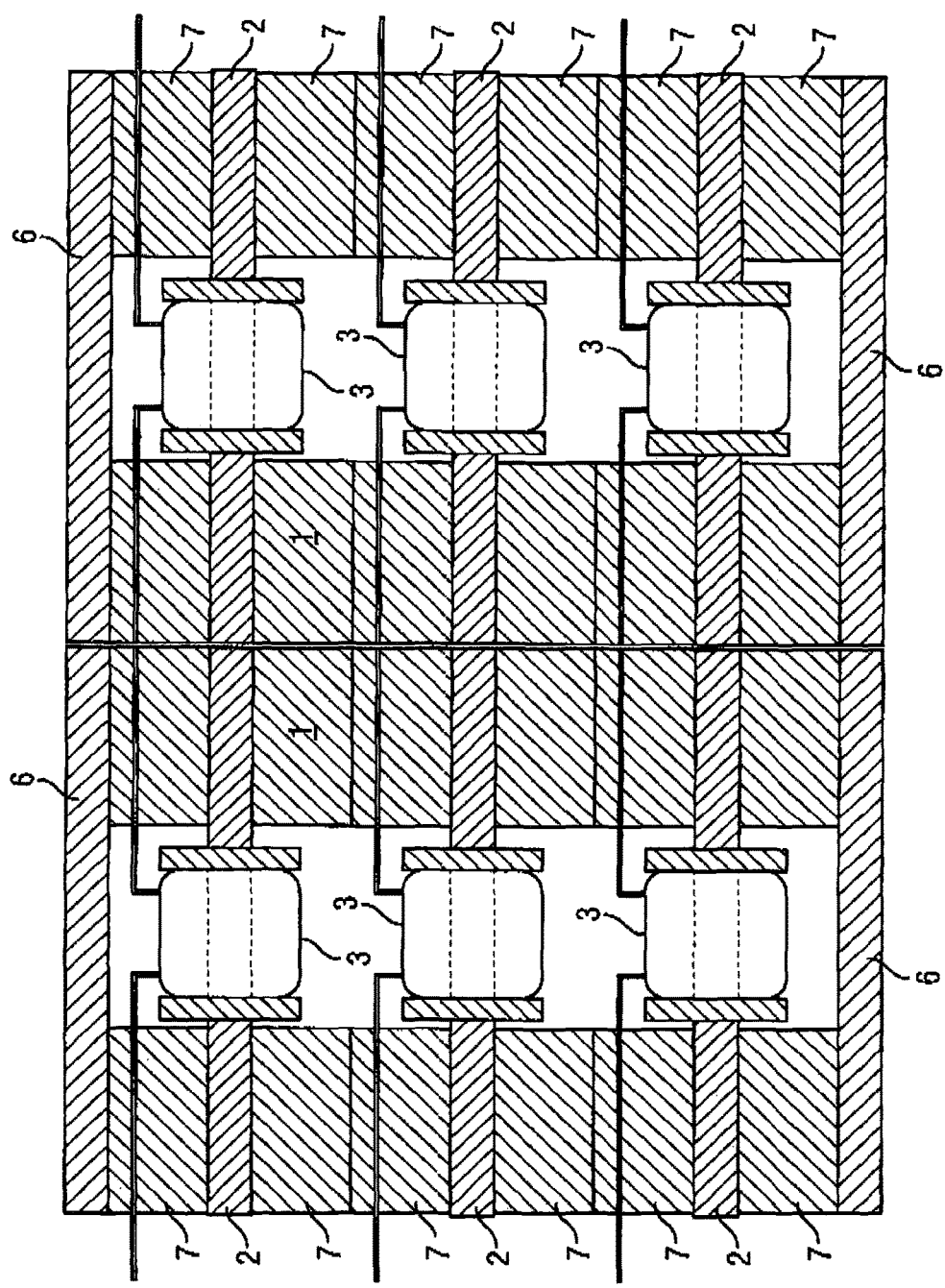
FIG. 16 is a schematic showing a FCL using a stacked coil/limb arrangement and connection of 3 phases to 2 pairs of coils.

As described earlier, the stacked FCL core includes a multiple of pairs of coil 3/limb members 2 bridging the gaps between permanent magnets 1. In certain realisations of the invention it may be considered advantageous to arrange a single phase per stacked FCL structure in which the total number of turns of the inductor is distributed in multitude of coils around the core FCL structure. It is however believed to be advantageous and preferable in certain embodiments that a single structure of a stacked FCL ring structure carries all three phases. By way of example and without limitation, this may be achieved by means of carrying all three phases in multiples of pairs of coils which act against statically saturated iron limbs in each direction. Each individual coil/limb assembly carries one phase and is wound in the sense which builds and opposes the static fluxes due to the permanent magnets in each half of the AC current cycle, respectively. Each coil matches a corresponding similar coil wound in an opposing sense with respect to the static fluxes and acting on the corresponding phase. Similar pairs of coils are arranged for the other two phases. FIG. 16 shows the connection of 3 phases to pairs of coils as described.

A multiple of pairs of limb member 2/coils 3 bridging the permanent magnets 1 may exist, the number depending on the electrical specification (i.e. current rating at normal and fault operation and the required inductance) and the strength and resistance to demagnetisation of the magnets 1. The windings of the coils may be disconnected and reconnected to allow conversion to single and a two-phase operation on the single stacked ring core structure.

Observations as a result of magnetic simulation indicate low interaction between the current currying inductors of each phase under normal un-faulted current operation. The advantage of the 3 phase FCL over a single phase utilisation of the same structure is that only ⅓ of the magnets within the FCL matrix at an instant in time are subjected to the maximum magnetic stress. The sharing of bias flux from the magnets between all the phase elements leads to an improved magnet utilisation within an integrated 3 phase Fault current limiter.

In terms of making the structure readily assemble-able and dis-assemble-able for manufacture and maintenance, in a FCL of the form of a stacked structure as shown in FIGS. 1 and 2, where limb members 2 with mounted coil windings 3 are arranged to bridge the gap between pairs of permanent magnets 1 and where additional layers of magnets and limbs are arranged adjacent to the said limb it is advantageous that the coil 3/limb member is readily insert-able/removable in event of the need for repair or replacement.

In accordance with an aspect of the present invention it is desirable that an operation may be undertaken in which the magnets 1 may be separated by a jacking adjustment for example by being jacked apart (e.g. along long-bolts located about the framework) around the magnets 1 and then a subsequent operation to pull or unscrew to withdraw the steel limb 2 (with encompassing coil windings 3 in place) in a direction along the radial direction of the coil parallel to the separated poles of the magnets facing either side of the steel limb 2 exposed either side of the coil 3. Arrows A in FIG. 1 show the jacking apart planes for two of the magnets 1 sandwiching the lowermost limb 2 in the stack core. During this procedure the permanent magnets 1 retain their pre-set magnetisation. A reverse process is adopted to insert a replacement limb 2/coil 3 assembly. Guides are used to ensure that laminated steel limbs 2 do not separate in the fashion of a fan and engage with the poles of the separated magnets 1. Additionally, laminations may be glued in order that the limb 2 maintains its form during the assembly/removal processes.

Figure 6:
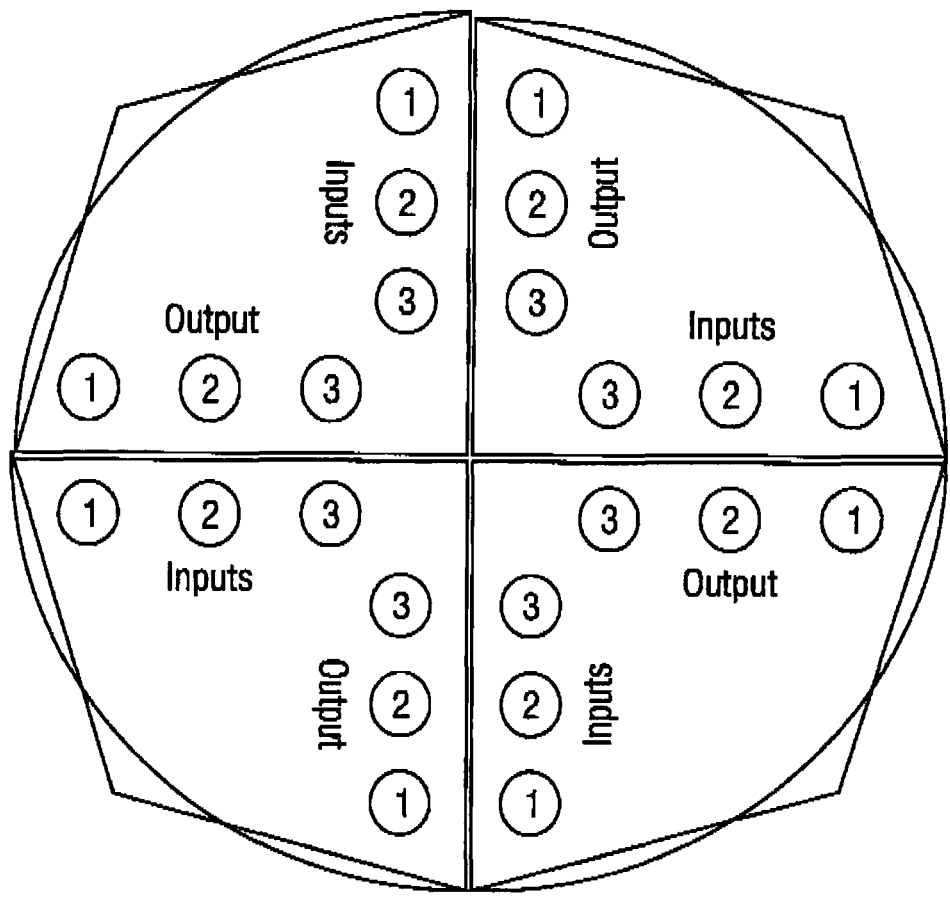
FIG. 6 is a plan schematic view of a FCL structure in accordance with an aspect of the invention, showing the external connectors to the coil windings.
Figure 7:
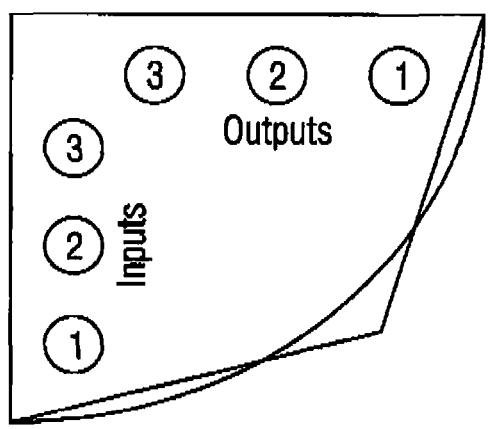
FIG. 7 shows a plan view of the quarter unit FCL of FIG. 6.
Figure 8:
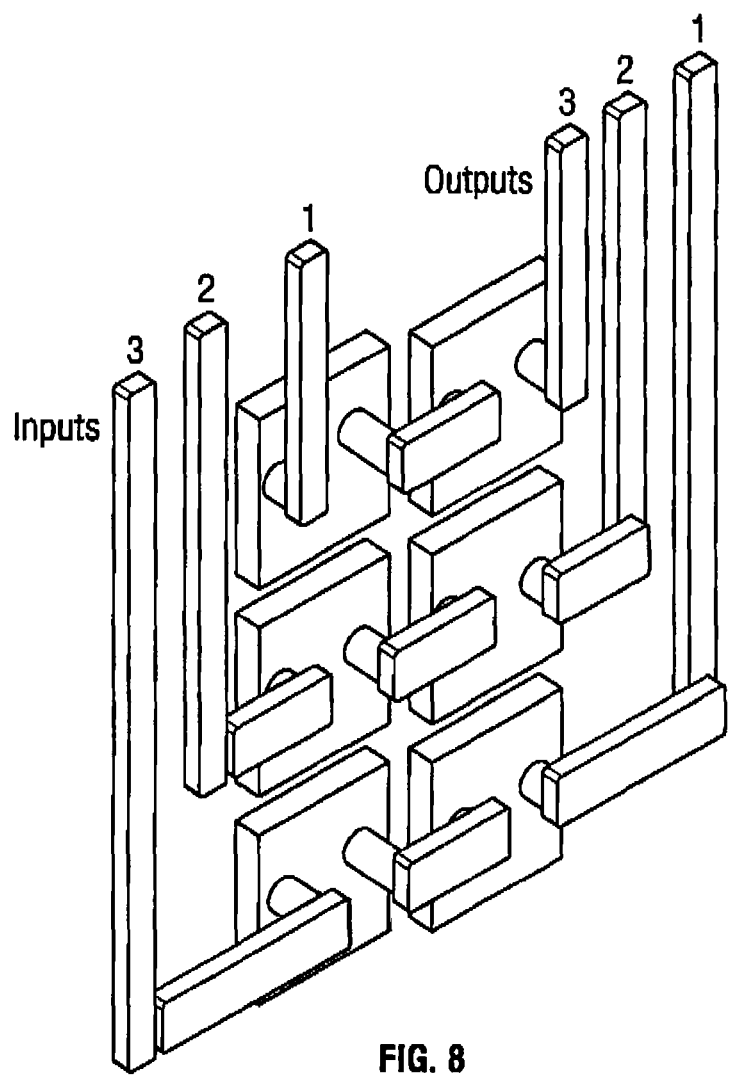
FIG. 8 shows schematically the input ad outlet connections between the coil windings and the external connectors for the quarter unit of FIG. 7.

Referring to FIGS. 6, 7 and 8, In a FCL of the form of a stacked ring structure, it is advantageous that any final connections, tapping connections or changeable inter-winding connections are accessible during and following the building process of the structure. To this end, in accordance with an aspect of the invention, most or all of such connectors are arranged at one end of the central annulus of the ring structure in order that subsequent manual access is not required within the confines of the annulus itself. Looking at FIG. 6 is a plan schematic view of a FCL structure, showing the external connectors to the coil windings. The input and output connectors are shown for each quarter unit numbered 1, 2 and 3. FIG. 7 shows a plan view of the quarter unit FCL of FIG. 6 and FIG. 8 shows schematically the input ad outlet connectors 1, 2, 3 between the coil windings and the external connectors for the quarter unit.

The FCL of the present invention is a current dependent nonlinear inductor structure where the impedance presented in series with the voltage source can be adjusted to accommodate a range of service currents. It is possible to connect FCL structures in series or in parallel (or in combinations of groups in series and parallel) in order to achieve differing service functionality In accordance with another aspect of the invention an FCL structure can be arranged with connections for connection to one or more other FCL structures such that the same plurality of different FCL structures can be connected in alternative configurations enabling different performance characteristics depending upon the way in which they are connected. This is exemplified in FIGS. 9, 10 and 11 in which 24 FCL structures 101 are connected three respective classes of FCL (eight FCL in each) in respective different configurations. In order to give different technical performance characteristics. For an FCL that is comprised of a number of small FCLs, for example say 24 small FCLs, typically 8 small FCLs could be connected per phase to form a complete 3 phase FCL. These small FCLs can be connected in a number of configurations to form a single phase connected FCL or a 3 phase FCL with 3 input and output connections.

Each small FCL, can for example be designed to provide a low impedance up to a given service current, one example would be 250 Amps RMS. Considering that in general, substation connections of high service current require a lower impedance range of fault current limiter, it is advantageous to arrange a number of parallel groups of windings within the FCL to both share the service current and lower the in circuit impedance range.

Figure 9:
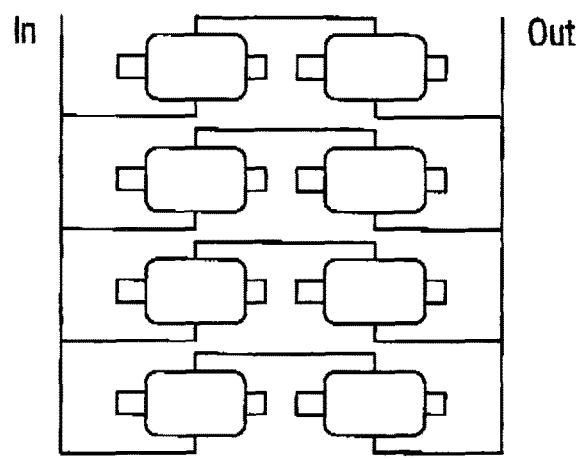
FIGS. 9 to 11 show alternative electrical connection arrangements for groups of FCL structures.
Figure 10:
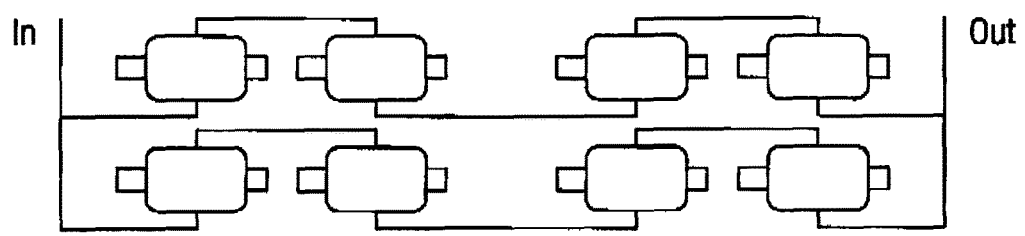
Figure 11:
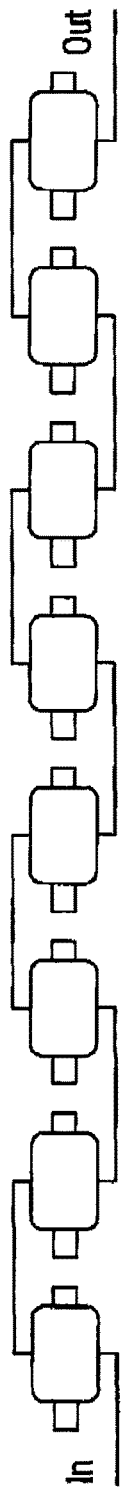

As an illustration of this concept, for an FCL which is comprised of 24 small FCLs it would be advantageous to connect the 8 FCL per phase into 3 configurations (as shown in FIGS. 9 to 11) to offer a product range to the market:

1000 A (20 MVA) wired per phase as 4 current branches each with 2 FCLs in series (FIG. 9)
  500 A (10 MVA) wired per phase as 2 current branches each with 4 FCLs in series (FIG. 10)
  250 A (5 MVA) wired per phase as 1 current branch with 8 FCLs in series. (FIG. 11).

Each of the separate groups of eight FCLs has the ability to be set up for use in a different configuration of series and parallel electrical connection arrangements. The connections would be present to enable connection into each of the 3 different configurations but selected to the desired configuration dependent upon the service requirement.

Similarly, using the example of 24 small FCLs, these could be arranged into a single phase unit to carry higher service currents. In this case it would be usual to employ 3 separate phase units to offer a balanced 3 phase installation.

Figure 12:
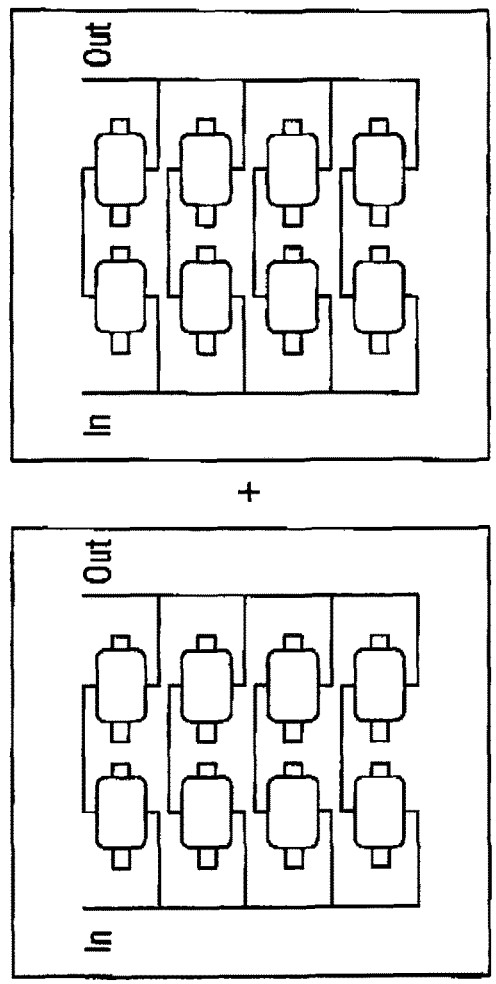
FIGS. 12 to 14 show how different FCL units can be connected.
Figure 13:
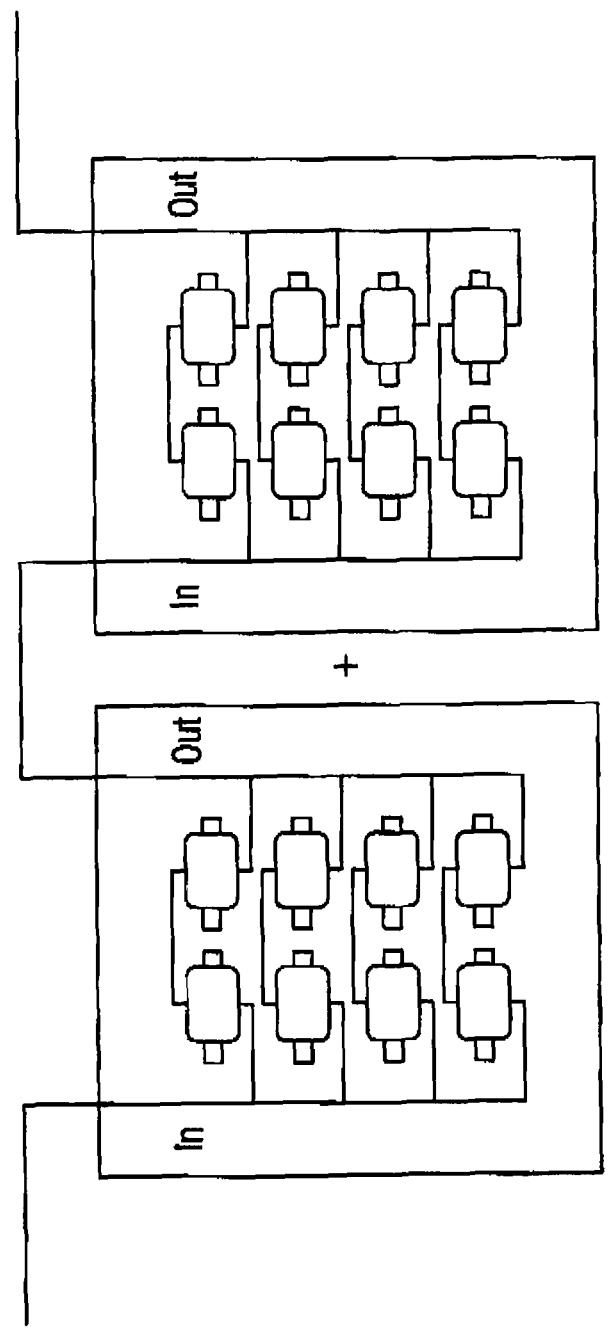
Figure 14:
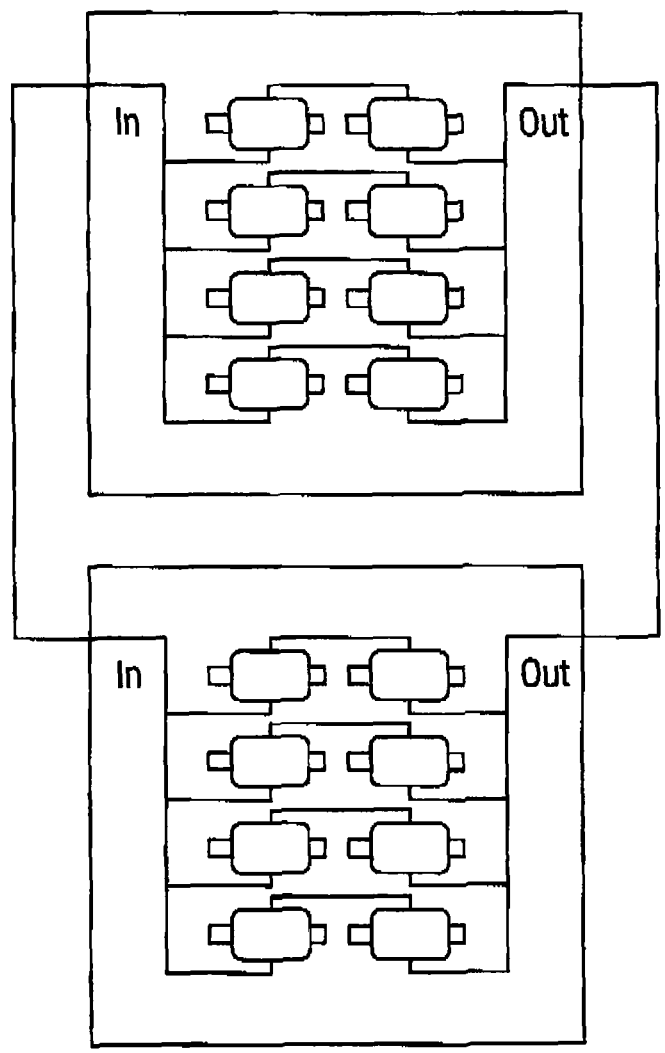

FIGS. 12 to 14 show how FCL units can be connected in tandem in series (FIG. 13) and in parallel (FIG. 14).

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The mere fact that certain measures are recited in mutually different dependent claims does not indicate that a combination of these measures cannot be used to advantage.

The invention claimed is:

1. A Fault Current Limiter (FCL) comprising:
at least one magnetisable limb member;
at least one electrically conductive coil associated with the magnetisable limb member and arranged to induce a field in the limb member;
magnets spaced such that the electrically conductive coil is positioned intermediate the spaced magnets; and
magnetisable shield elements disposed at opposed ends of the electrically conductive coil between the opposed ends of the coil and the magnets, wherein the magnetizable shield elements divert flux generated by the coil to a path away from adjacent closest surfaces of the magnets.

2. The FCL according to claim 1, wherein the magnetisable shield elements extend transversely to a limb axis.

3. The FCL according to claim 2, wherein the magnetisable shield elements are arranged to focus flux lines of the flux generated by the electrically conductive coil such that the flux lines run parallel to the at least one magnetisable limb member.

4. The FCL according to claim 1, wherein the magnetisable shield elements extend transversely to a limb axis in opposed directions away from the limb axis.

5. The FCL according to claim 1, wherein the magnetisable shield elements are in a magnetic circuit with the magnetisable limb member.

6. The FCL according to claim 1, wherein the electrically conductive coil is mounted on the limb member or on a magnetisable core member co-axial with the limb member.

7. The FCL according to claim 1, wherein respective limb members extend away from at least one of opposed ends of the electrically conductive coil, and each magnetisable shield element.

8. The FCL according to claim 1, wherein the limb member extends adjacent at least one of the magnets so as to form part of a magnetic circuit with the respective magnet.

9. The FCL according to any claim 1, wherein, the magnetisable shield elements have at least one of:
- a height dimension (h) sufficient to divert a sufficient proportion of coil fluxes due to an initial, sub-transient offset fault current which may demagnetise at least a portion of the permanent magnet which may be at least equal to a radial dimension of the electrically conductive coil; and
- a width dimension (w) that extends beyond the width of the magnetisable limb sufficient to divert a sufficient proportion of the coil fluxes due to the initial, sub-transient offset fault current which may demagnetise at least a portion of the permanent magnet which may be at least equal to the radial dimension of the electrically conductive coil; and
- a thickness dimension (t) sufficient to divert a sufficient proportion of the coil fluxes due to the initial, sub-transient offset fault current which may demagnetise at least a portion of the permanent magnet.

10. The FCL according to claim 1, wherein the magnetisable shield elements have a saturation magnetisation sufficient to divert a sufficient proportion of coil fluxes due to an initial, sub-transient offset fault current to avoid demagnetisation of at least a portion of the magnet.

11. The FCL according to claim 1, wherein the magnetisable shield elements comprise a ferromagnetic material.

12. The FCL according to claim 1, wherein the magnetisable shield elements are of laminated/ layered construction.

13. The FCL according to claim 1, wherein the magnetisable shield elements include a first array, set, or rank of magnetisable shield elements and second array, set, or rank of magnetisable shield elements positioned on opposite sides of the electrically conductive coil.

14. The FCL according to claim 13, wherein the first and second array, set, or rank of magnetisable shield elements comprises a plurality of shield elements separated by gaps.

15. The FCL according to claim 1, further comprising a structure having a plurality of repeating levels or ranks arranged one adjacent or above the other, each level or rank including a magnetisable limb member; an electrically conductive coil associated with the magnetisable limb member; and magnets spaced such that the core limb member extends intermediate the spaced magnets.

16. The FCL according to claim 15, wherein the structure is arranged to carry all three phases.

17. The FCL according to claim 16, wherein the structure is arranged to carry all three phases achieved by using pairs of coils which act against statically saturated iron limbs in each direction.

18. The FCL according to claim 15, wherein an outer portion of the structure comprises an outer magnetisable limb member extending between spaced magnets which outer magnetisable limb is free from an associated coil.

\* \* \* \* \*